US 011473469B2

United States Patent
Anderson et al.

(10) Patent No.: US 11,473,469 B2
(45) Date of Patent: Oct. 18, 2022

(54) INCREASE AFTERTREATMENT TEMPERATURE DURING LIGHT LOAD OPERATION

(71) Applicant: Cummins, Inc., Columbus, IN (US)

(72) Inventors: Travis Alva Anderson, Columbus, IN (US); Joan M. Wills, Nashville, IN (US); Rajkumar Subramanian, Columbus, IN (US); Vaibhav Daramwar, Columbus, IN (US); Pagalavan Mathari Bakthavatsalam, Columbus, IN (US); Paul Daniel Borisuk, Nashville, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 17/306,638

(22) Filed: May 3, 2021

(65) Prior Publication Data

US 2021/0254530 A1    Aug. 19, 2021

Related U.S. Application Data

(63) Continuation of application No. 16/408,811, filed on May 10, 2019, now Pat. No. 10,995,642, which is a continuation of application No. 15/416,695, filed on Jan. 26, 2017, now Pat. No. 10,287,945.

(51) Int. Cl.
| | |
|---|---|
| F01N 3/20 | (2006.01) |
| F02D 41/02 | (2006.01) |
| F02D 9/04 | (2006.01) |
| F02B 37/18 | (2006.01) |
| F01N 9/00 | (2006.01) |
| F02D 41/14 | (2006.01) |

(52) U.S. Cl.
CPC ............ *F01N 3/2066* (2013.01); *F01N 9/00* (2013.01); *F02B 37/18* (2013.01); *F02D 9/04* (2013.01); *F02D 41/024* (2013.01); *F02D 41/1448* (2013.01); *F01N 2900/1404* (2013.01); *F01N 2900/1406* (2013.01); *F02D 2700/04* (2013.01); *Y02T 10/12* (2013.01); *Y02T 10/40* (2013.01)

(58) Field of Classification Search
CPC .. F01N 3/2066; F01N 9/00; F01N 2900/1404; F01N 2900/1406; F02B 37/18; F02D 41/024; F02D 41/1448; F02D 2700/04; Y02T 10/12; Y02T 10/40; Y02A 50/20
See application file for complete search history.

(56) References Cited

U.S. PATENT DOCUMENTS

| | | | |
|---|---|---|---|
| 4,835,963 A | 6/1989 | Hardy | |
| 6,164,065 A | 12/2000 | Denari et al. | |
| 6,634,167 B1 * | 10/2003 | Toshioka | ............... F01N 3/0871 60/284 |

(Continued)

*Primary Examiner* — Audrey B. Walter
*Assistant Examiner* — Dapinder Singh
(74) *Attorney, Agent, or Firm* — Foley & Lardner LLP

(57) ABSTRACT

Systems, methods, and apparatuses are provided for increasing exhaust gas temperature. A system includes a valve and a controller coupled to the valve. The controller is structured to determine that a plurality of cylinders of an engine are active; compare an exhaust aftertreatment temperature to an exhaust aftertreatment temperature setpoint; and in response to the comparison, adjust an effective flow area for exhaust gas from the plurality of cylinders of the engine to increase an exhaust gas temperature.

20 Claims, 5 Drawing Sheets

(56) References Cited

U.S. PATENT DOCUMENTS

| | | |
|---|---|---|
| 6,938,410 B2 | 9/2005 | Glugla et al. |
| 7,854,114 B2 | 12/2010 | England |
| 7,856,815 B2 | 12/2010 | Demura et al. |
| 7,934,487 B2 | 5/2011 | Santoso et al. |
| 8,256,214 B2 | 9/2012 | Rioli et al. |
| 9,074,549 B1 | 7/2015 | Zur Loye |
| 10,287,945 B2 | 5/2019 | Anderson et al. |
| 2013/0247561 A1 | 9/2013 | Russ |
| 2014/0000242 A1 | 1/2014 | Hepburn et al. |
| 2014/0214308 A1* | 7/2014 | Mulloy .................. F02D 13/04 701/110 |
| 2016/0010528 A1 | 1/2016 | Light-Holets |
| 2016/0108798 A1 | 4/2016 | Vanderwege |
| 2016/0123203 A1 | 5/2016 | Light-Holets |
| 2018/0003118 A1* | 1/2018 | zur Loye ............ F02D 41/2422 |
| 2018/0010515 A1* | 1/2018 | Kolhouse ............. F02D 41/123 |

\* cited by examiner

INCREASE AFTERTREATMENT TEMPERATURE DURING LIGHT LOAD OPERATION

CROSS-REFERENCE TO RELATED APPLICATIONS

This Application is a continuation of U.S. application Ser. No. 16/408,811 entitled "Increase Aftertreatment Temperature During Light Load Operation," filed May 10, 2019, which is a continuation of U.S. application Ser. No. 15/416,695 entitled "Increase Aftertreatment Temperature During Light Load Operation," filed Jan. 26, 2017, which are both incorporated herein by reference in their entireties.

TECHNICAL FIELD

The present disclosure relates generally to exhaust devices and systems for use with internal combustion engines.

BACKGROUND

Air entering an internal combustion engine may be compressed, before fuel is injected, by a compressor which compresses air flowing into the engine cylinder. When exhaust gas containing NOx exits the exhaust manifold, the exhaust gas flows into the aftertreatment system of the exhaust system which is used to treat the exhaust gas. Conventional exhaust systems include any of several different components to reduce the levels of harmful exhaust emissions present in exhaust gas. Certain exhaust systems for diesel-powered internal combustion engines include a selective catalytic reduction (SCR) system to convert NOx (NO and $NO_2$ in some fraction) into harmless nitrogen gas ($N_2$) and water vapor ($H_2O$) in the presence of ammonia ($NH_3$). Over time deposits may form inhibiting the performance of the aftertreatment system such that it may be necessary to clean the exhaust system. Accordingly, a need exists for increasing the exhaust temperature during light load and idle operation to clean (e.g., remove (desorb) adsorbed hydrocarbons, remove "coke," minimize deposits, particulate matter, etc.) the aftertreatment system.

SUMMARY

One implementation relates to a method for increasing exhaust temperature of an exhaust system. The method includes receiving an inlet temperature of a selective catalytic reduction system, determining whether the inlet temperature meets a temperature setpoint, adjusting an exhaust manifold pressure setpoint based on the determination of the inlet temperature, determining whether the exhaust manifold pressure of at least one of first or second bank meet the exhaust manifold pressure setpoint, and causing an adjustment of an effective flow area of at least one of the first bank or second bank based on the exhaust manifold pressure, the adjustment of the effective flow area structured to increase exhaust temperature during light load operation.

One implementation relates to an apparatus. The apparatus includes a temperature control circuit structured to receive an inlet temperature of a selective catalytic reduction system, determine whether the inlet temperature meets a temperature setpoint, and adjust an exhaust manifold pressure setpoint based on the determination of the inlet temperature. The apparatus also includes a pressure control circuit structured to determine whether the exhaust manifold pressure of at least one of a first bank or second bank meets the exhaust manifold pressure setpoint, and cause an adjustment of an effective flow area of the at least one of the first bank or the second bank based on the exhaust manifold pressure. The adjustment of the effective flow area is structured to increase exhaust temperature during light load operation.

One implementation relates to a system. The system includes an exhaust throttle valve and a controller communicatively coupled to the exhaust throttle valve. The controller is structured to receive an inlet temperature of a selective catalytic reduction system, determine whether the inlet temperature meets a temperature setpoint, adjust an exhaust manifold pressure setpoint based on the determination of the inlet temperature, determine whether the exhaust manifold pressure of at least one of a first bank or second bank meets the exhaust manifold pressure setpoint, and cause, via the one or more exhaust throttle valves, an adjustment of an effective flow area of the at least one of the first bank or the second bank based on the exhaust manifold pressure. The adjustment of the effective flow area is structured to increase exhaust temperature during light load operation.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
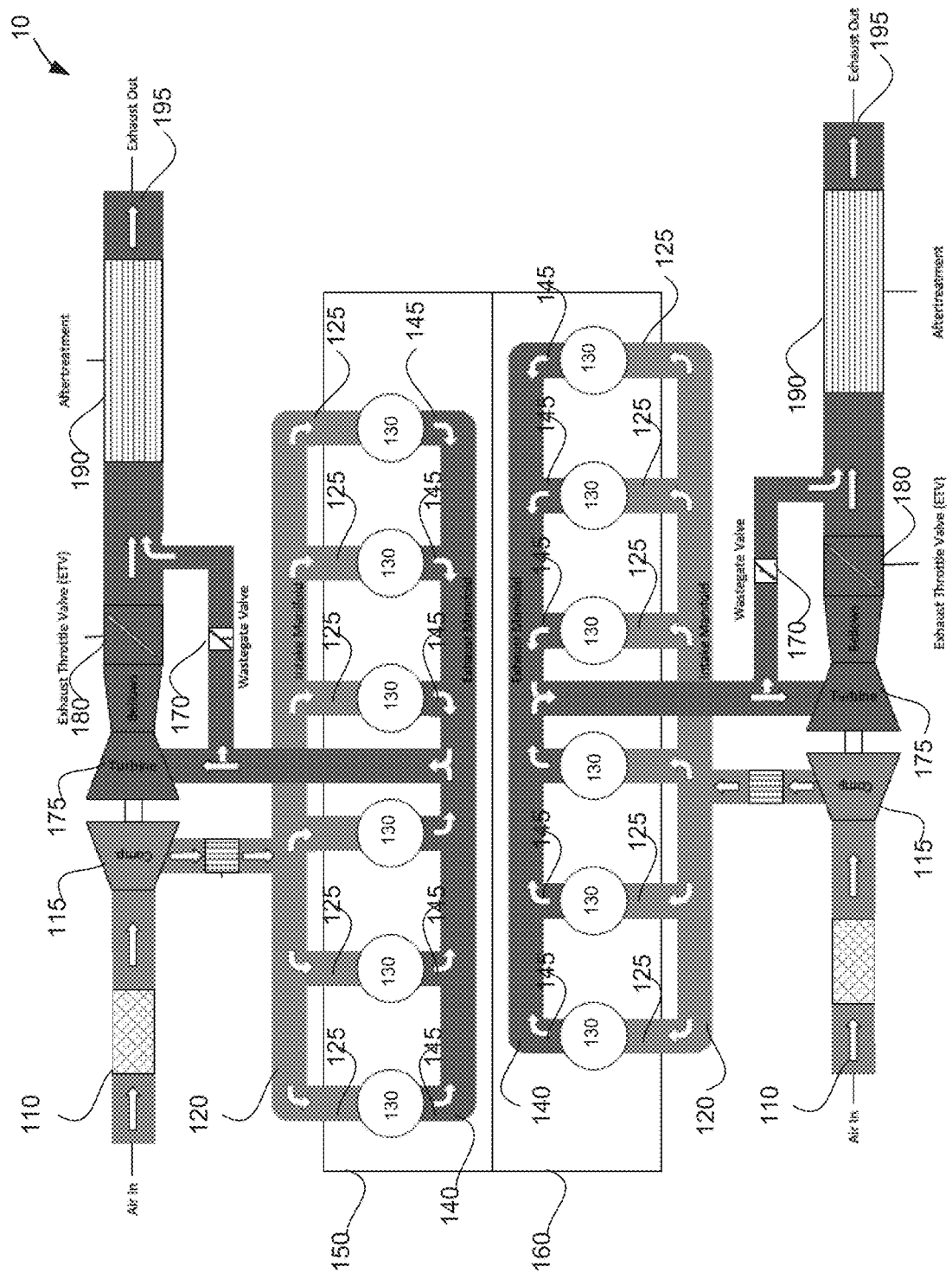
FIG. 1 is a schematic illustration of an exhaust system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the Figures generally, the various embodiments disclosed herein relate generally to a system and method for increasing the exhaust temperature of an exhaust system. According to the present disclosure, the system includes a selective catalytic reduction system, a wastegate valve, an exhaust throttle valve, and a controller. The controller is communicatively coupled to the exhaust throttle valve, the wastegate valve, and the selective catalytic reduction system. The controller is structured to receive an inlet temperature of the selective catalytic reduction system, determine whether the inlet temperature meets a temperature setpoint, adjust an exhaust manifold pressure setpoint based on the determination of the inlet temperature, determine whether the exhaust manifold pressure of at least one of a first bank or second bank meets the exhaust manifold pressure setpoint, and cause an adjustment of an effective flow area of at least one of the first bank or the second bank based on the exhaust manifold pressure. The adjustment of the effective flow area is structured to increase exhaust temperature during light load operation.

Various embodiments of the systems and methods described herein for increasing the exhaust temperature of an exhaust system may provide benefits that include, for example (1) increasing the pumping load on the engine; (2) minimizing the impact to air mass flow on the fired bank; (3) increasing exhaust temperatures in light load and idle operation; and (4) cleaning the exhaust system.

FIG. 1 depicts an exhaust system 10 according to an example embodiment. The exhaust system 10 includes an air intake system 110, compressor 115, intake manifold 120, cylinder 130, exhaust manifold 140, wastegate valve 170, turbine 175, exhaust throttle valve 180, aftertreatment system 190, and exhaust outlet 195. The intake manifold 120, cylinder 130, and exhaust manifold 140 may be included in a bank (e.g., the engine block) of the engine. The exhaust system 10 may include a single bank (e.g., the bank 150). In some examples, the exhaust system 10 may include a plurality of banks, such as the banks 150, 160. The engine may include an inline engine, V-type engine, flat engine, high-horsepower engine, or any other engine comprising one or more cylinders. Such engines may utilize or be fluidly coupled to one or more exhaust throttle valves 180, wastegate valves 170, turbochargers, and pressure sensors, etc. per bank 150, 160. In some embodiments, an engine may utilize or be fluidly coupled to one or more exhaust throttle valves 180, wastegate valves 170, turbochargers, and pressure sensors, etc. of a portion (e.g., a quadrant) of one or more banks 150, 160.

The air intake system 110 is structured to receive air into the combustion mixture of the exhaust system 10. The air intake system 110 may include an air inlet, an air filter, etc. The air received by the air inlet is received by the air filter. The air exits the air filter after having particulate matter substantially filtered from the air.

The compressor 115 is structured to compress (e.g., compress oxygen molecules together) air flowing into one or more cylinders 130 of an internal combustion engine. In some embodiments, the compressor 115 may be included in a turbocharger (not shown). The compressor 115 may include an impeller (e.g., a compressor wheel) which may be driven or otherwise actuated via a turbine (e.g., the turbine 175). As the impeller turns air is received or otherwise driven into the impeller to convert the air into a high-pressure, low-velocity air stream according to a diffusion process. The air (e.g., the compressed air) is driven, via the intake manifold 120, into the bank 150 of the engine. In example embodiments wherein a plurality of banks are active, the air may be driven, via the intake manifold 120 of each respective bank, into the banks 150, 160 of the engine. Advantageously, the compressed air enables the engine to burn more fuel and generate more power.

The intake manifold 120 is structured to receive or otherwise provide the combustion mixture (e.g., the air only, fuel only, a combination of air and fuel, etc.) to the cylinders 130. For example, in an example including a diesel engine, the intake manifold 120 may receive or otherwise provide air to the cylinders 130. The intake manifold 120 includes a plurality of intake pipes 125 structured to distribute (e.g., evenly distribute) the combustion mixture and, thereby, drive the combustion mixture into the cylinders 130. The cylinders 130 are structured to receive and ignite the combustion mixture. Each cylinder 130 may include a piston structured to compress the combustion mixture. In some embodiments including, for example, a diesel engine, the fuel is injected into the compressed air and self-ignites. In other embodiments including, for example, a spark-ignited engine, the piston engages a crankshaft and spark plug to, thereby, ignite the combustion mixture and generate exhaust gas. The cylinders 130 may be disposed in series, side-by-side, in parallel, etc., in the bank 150 (e.g., the engine block). The exhaust gas exits the cylinders 130 into the exhaust manifold 140.

The exhaust manifold 140 is structured to receive, via one or more exhaust pipes 145, the exhaust gas from the cylinders 130. In some embodiments, the exhaust gas may be received into a single pipe of the exhaust manifold 140. Responsive to receiving the exhaust gas, the exhaust manifold 140 may be further structured to drive the exhaust gas from the bank 150 or banks 150, 160 into at least one of the wastegate valve 170, the turbine 175, or the exhaust throttle valve 180.

Figure 2:
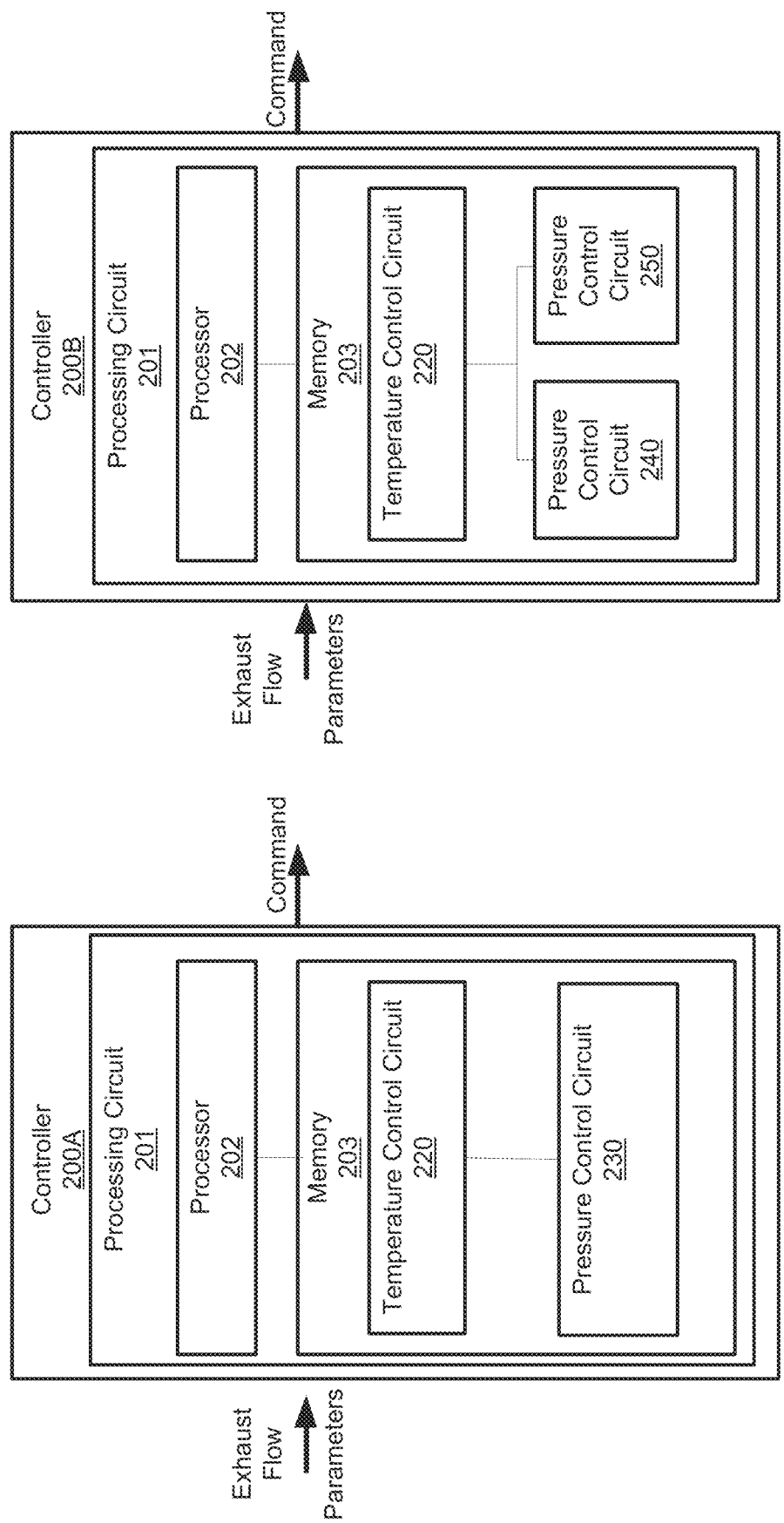
FIG. 2A is a schematic diagram of an example controller that may be used with the systems of FIG. 1.
FIG. 2B is a schematic diagram of an example controller that may be used with the systems of FIG. 1.

The wastegate valve 170 is structured to drive exhaust gases away from the turbine 175. In some embodiments, the wastegate valve 170 may be included in a turbocharger (not shown). As depicted, each bank 150, 160 is fluidly coupled to the wastegate valve 170. The wastegate valve 170 is communicatively coupled to a controller (e.g., the controller depicted in FIG. 2A or 2B). The wastegate valve 170 is structured to adjust the effective flow area (e.g., the area through which or by which the exhaust gases may flow). In some embodiments, the wastegate valve 170 may include a wastegate bore diameter of approximately one-third of the diameter of the exhaust throttle valve. The wastegate valve 170 may be any dimension suitable to carry out the functions of the description provided that the wastegate valve 170 is small enough to provide fine resolution of control and large enough to pass the required bypass flow without excessive restriction. The wastegate valve 170 may be manipulated, actuated by, or otherwise controlled by the controller.

The turbine 175 may include an impeller structured to receive exhaust flow driven or otherwise guided by the turbine 175 into the impeller. In some embodiments, the turbine 175 may be included in a turbocharger (not shown). When exhaust gas containing NOx exits the turbine 175, the exhaust gas flows downstream to the exhaust throttle valve 180 and/or into the aftertreatment system 190.

The exhaust throttle valve 180 is structured to control the condition of the exhaust gas. The exhaust throttle valve 180 may be any mechanism that can control the flow rate and/or pressure of a fluid stream. Generally, the exhaust throttle valve 180 includes a housing and a control surface that interacts with the exhaust gas to increase backpressure or decrease backpressure. The exhaust throttle valve 180 is communicatively coupled to a controller (e.g., the controller depicted in FIG. 2A or 2B). The exhaust throttle valve 180 may be manipulated, actuated by, or otherwise controlled by the controller.

Although not shown in FIG. 1, the exhaust system 10 includes a controller (e.g., the depicted in FIG. 2A or 2B) structured to cause the exhaust system 10 to increase the exhaust temperature during light load operation. The controller 200A, 200B may include a microprocessor, an application-specific integrated circuit (ASIC), a field-programmable gate array (FPGA), etc., or combinations thereof. The controller 200A, 200B may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 200A, 200B can read programmatic instructions.

In some embodiments, the controllers 200A, 200B is structured to receive an inlet temperature of a selective catalytic reduction system, determine whether the inlet temperature meets a temperature setpoint, adjust an exhaust manifold pressure setpoint based on the determination of the inlet temperature, determine whether the exhaust manifold pressure of at least one of a first bank or second bank meets the exhaust manifold pressure setpoint, and cause an adjustment of an effective flow area of at least one of the first bank or the second bank based on the exhaust manifold pressure to increase the exhaust temperature during light load operations as described herein with reference to FIGS. 2A and 2B.

The aftertreatment system 190 is structured to reduce emission of particulate matter, nitrogen oxides (NOx), hydrocarbons, and other environmentally harmful pollutants. In some embodiments, the aftertreatment system 190 includes a diesel particulate filter (DPF), a diesel oxidation catalyst (DOC), a selective catalytic reduction (SCR) system with a SCR catalyst, and an ammonia oxidation (AMOx) catalyst. The aftertreatment system 190 receives the exhaust gas via at least one of the exhaust manifold 140, exhaust throttle valve 180, wastegate valve 170, or turbine 175. After undergoing treatment, the exhaust gas flows or otherwise exits the exhaust system 10 out of the outlet 195.

Although not shown in FIG. 1, the exhaust system 10 can include sensors such as, for example, temperature sensors, pressure sensors, NOx sensors, oxygen sensors, ammonia sensors and/or any other sensors. The controller may be communicatively coupled to one or more such sensors to receive and interpret signals, information, or data from one or more of these sensors. The controller may use the information from one or more of these sensors to carry out the functions as described herein.

With the above description in mind, referring now to FIGS. 2A and 2B, an example structure for the controllers 200A, 200B is shown according to one embodiment. As shown, the controllers 200A, 200B includes a processing circuit 201 including a processor 202 and a memory 203. The processor 202 may be implemented as a general-purpose processor, an ASIC, one or more field programmable gate arrays (FPGAs), a digital signal processor (DSP), a group of processing components, or other suitable electronic processing components. The one or more memory devices 203 (e.g., RAM, ROM, Flash Memory, hard disk storage, etc.) may store data and/or computer code for facilitating the various processes described herein. Thus, the one or more memory devices 203 may be communicably connected to the processor 202 and provide computer code or instructions to the processor 202 for executing the processes described in regard to the controllers herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 may include various circuits for completing at least some of the activities described herein. More particularly, the memory 203 includes the temperature control circuit 220 which is structured to facilitate the increase of the exhaust temperature. While the memory 203 of each respective controller 200A, 200B depicted is shown to include the temperature control circuit 220 and pressure control circuit 230, 240, 250 it should be understood that the controllers 200A, 200B and memory 202 may include any number of circuits for completing the functions described herein. For example, the activities of multiple circuits may be combined as a single circuit, additional circuits with additional functionality may be included, etc. Further, it should be understood that the controllers 200A, 200B may control other activity beyond the scope of the present disclosure, such as the control of other vehicle systems. In this regard, the controllers 200A, 200B may be embodied as an electronic control unit (ECU), proportional integrated controller (PID), etc. included with a vehicle or included with an existing ECU, such as a transmission control unit and any other vehicle control unit (e.g., exhaust aftertreatment control unit, powertrain control circuit, engine control circuit, etc.). All such structural configurations of the controllers 200A, 200B are intended to fall within the spirit and scope of the present disclosure. Although both the controller 200A and 200B are shown, some example configurations may include a single controller 200A or a plurality of controllers such as the controller 200A and 200B up to n number of controllers. The controller 200A may be communicatively coupled to a single bank 150 (e.g., an active bank, inactive bank, or a combination thereof) via the temperature control circuit 220 and/or the pressure control circuit 230. The controller 200B may be communicatively coupled to a plurality of banks 150, 160 (e.g., an active bank, inactive bank, or a combination thereof) via the temperature control circuit 220 and/or the pressure control circuits 240 and 250. Each controller 200A and 200B may be associated with separate banks 150, 160, separate exhaust throttle valves 180, separate wastegate valves 170, separate turbines 175, separate aftertreatment systems 190, separate exhaust manifolds 140, separate intake manifolds 120, etc. In some embodiments, a single controller 200A or a plurality of controllers 200A, 200B may be communicatively coupled to a portion (e.g., a quadrant) of one or more banks 150, 160.

The temperature control circuit 220 is structured to receive an inlet temperature of a selective catalytic reduction (SCR) system. As used herein, the term "inlet temperature" may refer to a measured value indicative of the exhaust temperature, bed temperature, etc. of the SCR system. The temperature control circuit 220 may receive the inlet temperature from the SCR system of a fired bank. In one embodiment, the temperature control circuit 220 may be communicatively coupled to one or more sensors for receiving values indicative of the inlet temperature. For example, the temperature control circuit 220 may receive, via one or more sensors and/or the memory 203, values indicative of the inlet temperature associated with the selective catalytic reduction system, exhaust system, etc. In still another embodiment, the temperature control circuit 220 may include machine-readable media stored by the memory and executable by the processor, wherein the machine-readable media facilitates performance of certain operations to receive values indicative of the inlet temperature. For example, the machine-readable media may provide an instruction (e.g., command, etc.) to a sensor operatively coupled to the selective catalytic reduction system or any other system or component of the exhaust system 10 to monitor and acquire data indicative of the inlet temperature. In this regard, the machine-readable media may include programmable logic that defines the frequency of acquisition of the exhaust temperature data.

The temperature control circuit 220 is structured to determine whether the inlet temperature meets a temperature setpoint (e.g., an inlet temperature setpoint for the SCR system of a bank that is active or otherwise fired). The temperature setpoint may be a predetermined value and/or a value calculated according to a programmatic algorithm based on the type of exhaust system cleaning to be performed. For example, the temperature setpoint may be predetermined at 300° C. to remove stored hydrocarbons, 350° C. to remove coke, and 450° C. to remove urea deposits. The temperature control circuit 220 may select the temperature setpoint which corresponds to the type of cleaning required. In some embodiments, the temperature control circuit 220 may be structured to compare the inlet temperature to the temperature setpoint to determine whether the inlet temperature meets the temperature setpoint. In other embodiments, the temperature control circuit 220 may subtract the inlet temperature from the temperature setpoint to determine whether the inlet temperature meets the temperature setpoint or is otherwise within a predetermined range of the temperature setpoint. Yet in some embodiments, the temperature control circuit 220 may determine whether the inlet temperature meets the temperature setpoint or is otherwise within a predetermined range of the temperature setpoint according to a programmatic algorithm. The inlet temperature, temperature setpoint, and any associated parameters described herein may be stored in memory (e.g., memory 203) by the temperature control circuit 220.

The temperature control circuit 220 is further structured to adjust an exhaust manifold pressure setpoint based on the determination of the inlet temperature. The exhaust manifold pressure setpoint may take the form of a normalized value associated with the exhaust manifold setpoint. The normalized value may be a function of various parameters such as, but not limited to, engine speed, total fuel, etc. The exhaust manifold pressure setpoint advantageously provides limits for charge flow protection, engine protection, etc. The temperature control circuit 220 may limit the exhaust manifold pressure setpoint to be less than the maximum pressure the engine can support. Such limits may be adjusted by calibration. If the inlet temperature (e.g., the SCR inlet temperature) is below the temperature setpoint, the temperature control circuit 220 increases the exhaust manifold pressure setpoint provided to the pressure control circuit 230. The exhaust manifold pressure setpoint may be increased according to a calibrateable range. In example embodiments wherein a plurality of banks are active, such as the first bank 150 and the second bank 160, the exhaust manifold pressure setpoint may be based on the inlet temperature expressing the lowest temperature (e.g., the inlet temperature of the coldest SCR) of the banks 150, 160 to ensure that exhaust temperatures are increased to a level by which an exhaust system cleaning is obtained on both the first bank 150 and the second bank 160. In examples in which the inlet temperature expressing the highest temperature of the plurality of banks approaches a maximum temperature threshold, the temperature control circuit 220 may switch from controlling the coldest bank against the temperature setpoint and instead regulate the bank expressing the highest temperature against the maximum temperature threshold.

The exhaust manifold pressure setpoint may be increased or decreased between banks 150, 160. Each respective bank 150, 160 may be active (e.g., a bank in which one or more cylinders are firing or otherwise igniting the combustion mixture) or inactive (e.g., a bank in which one or more cylinders are not firing or otherwise igniting the combustion mixture). The temperature control circuit 220 may increase the exhaust manifold pressure setpoint of an inactive bank (e.g., a non-fired bank) prior to increasing the exhaust manifold pressure setpoint on an active bank (e.g., a fired bank). In another example, the temperature control circuit 220 may increase the exhaust manifold pressure setpoint of an active bank (e.g., a fired bank) prior to increasing the exhaust manifold pressure setpoint of an inactive bank (e.g., the non-fired bank). Yet in other examples, the temperature control circuit 220 may simultaneously increase the exhaust manifold pressure setpoint of an active bank (e.g., a fired bank) and the exhaust manifold pressure setpoint of an inactive bank (e.g., the non-fired bank). The exhaust manifold pressure setpoint and any associated parameters described herein may be stored in memory (e.g., memory 203) by the temperature control circuit 220. The temperature control circuit 220 may utilize the processor 202 to perform the actions described herein.

The pressure control circuit 230 is structured to determine whether the exhaust manifold pressure (e.g. a value indicative of the measured exhaust manifold pressure) of at least one of a first bank or second bank meets the exhaust manifold pressure setpoint. Alternatively or additionally, the pressure control circuit 230 is structured to determine whether the exhaust manifold pressure corresponds to a pressure value of a location between the turbine and exhaust throttle valve. To that end, the pressure control circuit 230 is structured to receive the exhaust manifold pressure setpoint provided by the temperature control circuit 220. In example embodiments wherein a plurality of banks are active, such as the first bank 150 and the second bank 160, the pressure control circuits 240, 250 may be structured to receive the exhaust manifold pressure setpoint provided by the temperature control circuit 220.

Each pressure control circuit is structured to receive the exhaust manifold pressure (e.g. a value indicative of the measured exhaust manifold pressure) for an active bank, inactive bank, or a combination thereof. For example, the pressure control circuit 230 may receive the exhaust manifold pressure for the active bank (e.g., the fired bank). In some embodiments, the pressure control circuit 230 may receive the exhaust manifold pressure for the inactive bank (e.g., the non-fired bank). Yet, in other embodiments, the exhaust manifold pressure of the active bank and/or the inactive bank may be received via one or more pressure control circuits such as the pressure control circuits 240, 250 included in the controller 200B. The pressure control circuit (e.g., the pressure control circuit 230, 240, 250) may include or be communicably coupled to one or more sensors for receiving values indicative of the exhaust manifold pressure of each respective bank. For example, the pressure control circuit 230 may receive, via one or more sensors and/or the memory 203, values indicative of the exhaust manifold pressure of the inactive bank (e.g., the non-fired bank) and/or the active bank (e.g., the fired bank). In still another embodiment, the pressure control circuits 240, 250 may receive, via one or more sensors and/or the memory 203, values indicative of the exhaust manifold pressure of one or more inactive banks (e.g., non-fired banks) and/or one or more active banks (e.g., fired banks). The pressure control circuit may include machine-readable media stored by the memory and executable by the processor, wherein the machine-readable media facilitates performance of certain operations to receive values indicative of the exhaust manifold pressure of each respective bank. Accordingly, the machine-readable media may provide an instruction (e.g., command, etc.) to a sensor operatively coupled to the exhaust system 10 to monitor and acquire data indicative of the exhaust manifold pressure. The machine-readable media may include programmable logic that defines the frequency of acquisition of the exhaust temperature data.

If the pressure control circuit determines that the exhaust manifold pressure of at least one of the first bank 150 or the second bank 160 is below the exhaust manifold pressure setpoint, the pressure control circuit (e.g., the pressure control circuit 230, 240, and/or 250) adjusts (e.g., re-positions, opens, closes, etc.) the exhaust throttle valve 180 and/or the wastegate valve 170 which, thereby, reduces the effective flow area. The degree to which the exhaust throttle valve 180 is adjusted respective to the wastegate valve 170 may be predetermined or determined according to a calibrateable adjustment. Each pressure control circuit (e.g., the pressure control circuit 240 and 250) may be associated with separate banks 150, 160, exhaust throttle valves 180, wastegate valves 170, turbines 175, aftertreatment systems 190, exhaust manifolds 140, etc. such that the exhaust throttle valves 180 and/or wastegate valves 170 operate or otherwise adjust independently for each bank 150, 160. For example, the position of the exhaust throttle valves 180 and/or wastegate valves 170 may vary from one bank (e.g., the bank 150) to another bank (e.g., the bank 160) even when the same exhaust manifold pressure setpoint is determined or otherwise provided for both banks 150, 160. To keep the air-to-fuel ratio (e.g., the proportion of air to fuel in the exhaust system) balanced in both the first bank 150 and the second bank 160, the same exhaust manifold pressure setpoint is commanded to the first bank 150 and the second bank 160 with all cylinders firing (e.g., when both banks are active).

The pressure control circuit (e.g., the pressure control circuit 230, 240, and/or 250) is structured to increase the pumping load of the engine (e.g., an inline engine, V-type engine, etc.) of the exhaust system 10. Accordingly, the exhaust throttle valve 180 and/or the wastegate valve 170 may be engaged or otherwise utilized to increase the pumping load on the engine such that the exhaust temperature increases during light load operation. Alternatively or additionally, the exhaust throttle valve 180 and/or the wastegate valve 170 may be engaged or otherwise utilized to increase the exhaust temperature during idle operation of the engine responsive to the increase in the pumping load. In various embodiments, one or more sensors (e.g., an electrical sensor) may be configured to receive and interpret engine operating parameters such as, but not limited to, an engine on/off condition, engine load, etc.

The pressure control circuit 230 is also structured to reduce an air mass flow (e.g., the amount of air included in or otherwise flowing through the exhaust system) of the first bank 150, the second bank 160, or a combination thereof. The reduction of the air mass flow reduces the air-to-fuel ratio (e.g., the proportion of air to fuel in the exhaust system). In some embodiments, the exhaust throttle valve 180 may be engaged or otherwise utilized on an inactive bank (e.g., a bank that includes cylinders which are not operable or otherwise engaged). When the exhaust throttle valve 180 is engaged with the inactive bank, the pumping load increases on the engine while minimizing the impact to the air mass flow on the active bank (e.g., fired bank). In some embodiments, the exhaust throttle valve 180 may be engaged or otherwise utilized on an active bank (e.g., a fired bank). When the exhaust throttle valve 180 is engaged with the active bank, the pumping load increases on the engine while also reducing the air mass flow on the active bank. Advantageously, the air mass flow reduction leads to further increases in exhaust temperature while reducing the air-to-fuel ratio. The air-to-fuel ratio may be indicated, determined, and/or received by the pressure control circuit (e.g., the pressure control circuit 230, 240, and/or 250) via one or more sensors (e.g., one or more oxygen sensors) and/or the memory 203.

The pressure control circuit 230 is structured to cause an adjustment of the effective flow area (e.g., the area through which or by which the exhaust gases may flow) of at least one of the first bank 150 or the second bank 160 based on the exhaust manifold pressure. The exhaust system 10 may be structured to vary the effective flow area for an inactive bank (e.g., non-fired bank and/or cylinders) independent of an active bank (e.g., fired bank and/or cylinders). The adjustment of the effective flow area may be caused via at least one of the wastegate valve 170 or the exhaust throttle valve 180. In some embodiments, the adjustment of the effective flow area may be caused in response to an inactive bank (e.g., a bank that includes cylinders which are not operable or otherwise engaged). Yet in other embodiments, the adjustment of the effective flow area may be caused in response to reducing the cylinders structured to operate the engine via one or more banks 150, 160. For example, the adjustment of the effective flow area may be caused in response to operating the engine on fewer cylinders. The adjustment of the effective flow area is structured to increase the exhaust temperature during light load operation as described herein above.

In order to cause the adjustment of the effective flow area (e.g., the area through which or by which the exhaust gases may flow) of at least one of the first bank 150 or the second bank 160 based on the exhaust manifold pressure, the pressure control circuit 230 is structured to generate an effective flow area command. The effective flow area command is structured to reduce the effective flow area to control the increase in the exhaust temperature, exhaust pressure, and/or pumping load. In some embodiments, the effective flow area command may be structured to increase the effective flow area. After generation of the effective flow area command, various components of the exhaust system 10 such as, for example, the exhaust throttle valve 180, the wastegate valve 170, or a combination thereof may be engaged. For example, the exhaust throttle valve 180 and the wastegate valve 170 may be engaged or otherwise actuated (e.g., opened, closed, etc.) independently or in combination to adjust the effective flow area of the exhaust system 10.

Adjustment of the effective flow area via the exhaust throttle valve 180 and the wastegate valve 170 may also be used to reduce the air mass flow of the exhaust system 10 as described herein.

The position of the exhaust throttle valve 180 and the wastegate valve 170 may be adjusted independently of the other. In some embodiments, the flow of exhaust gas through the wastegate valve 170 is structured to bypass the exhaust throttle valve 180. In other embodiments, the flow of exhaust gas through the exhaust throttle valve 180 is structured to bypass the wastegate valve 170. The exhaust throttle valve 180 may include a first diameter. The wastegate valve 170 may include a second diameter. In embodiments wherein the first diameter is larger than the second diameter, the exhaust throttle valve 180 may be engaged to make coarse adjustments to the effective flow area and the wastegate valve 170 may be engaged to make finer adjustments to effective flow area. As the exhaust throttle valve 180 and/or the wastegate valve 170 is engaged or otherwise adjusted (e.g., closed, opened, etc.) responsive to the generation of the effective flow area command, the effective flow area is reduced. In turn, the exhaust temperature is increased which, thereby, cleans the exhaust system 10.

Figure 3:
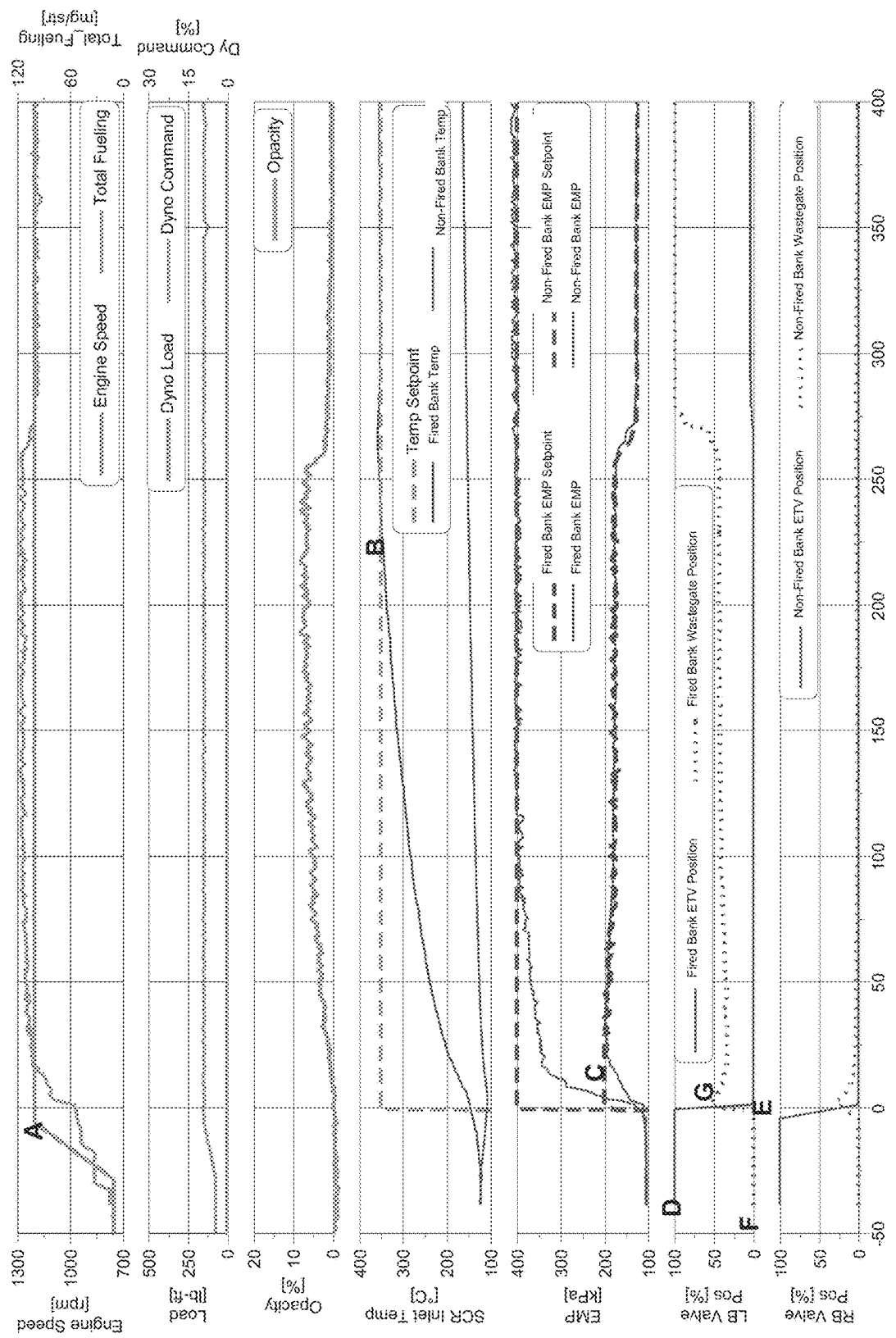
FIG. 3 is a graph of various parameters vs time based on utilization of a bank according to an example embodiment.
Figure 4:
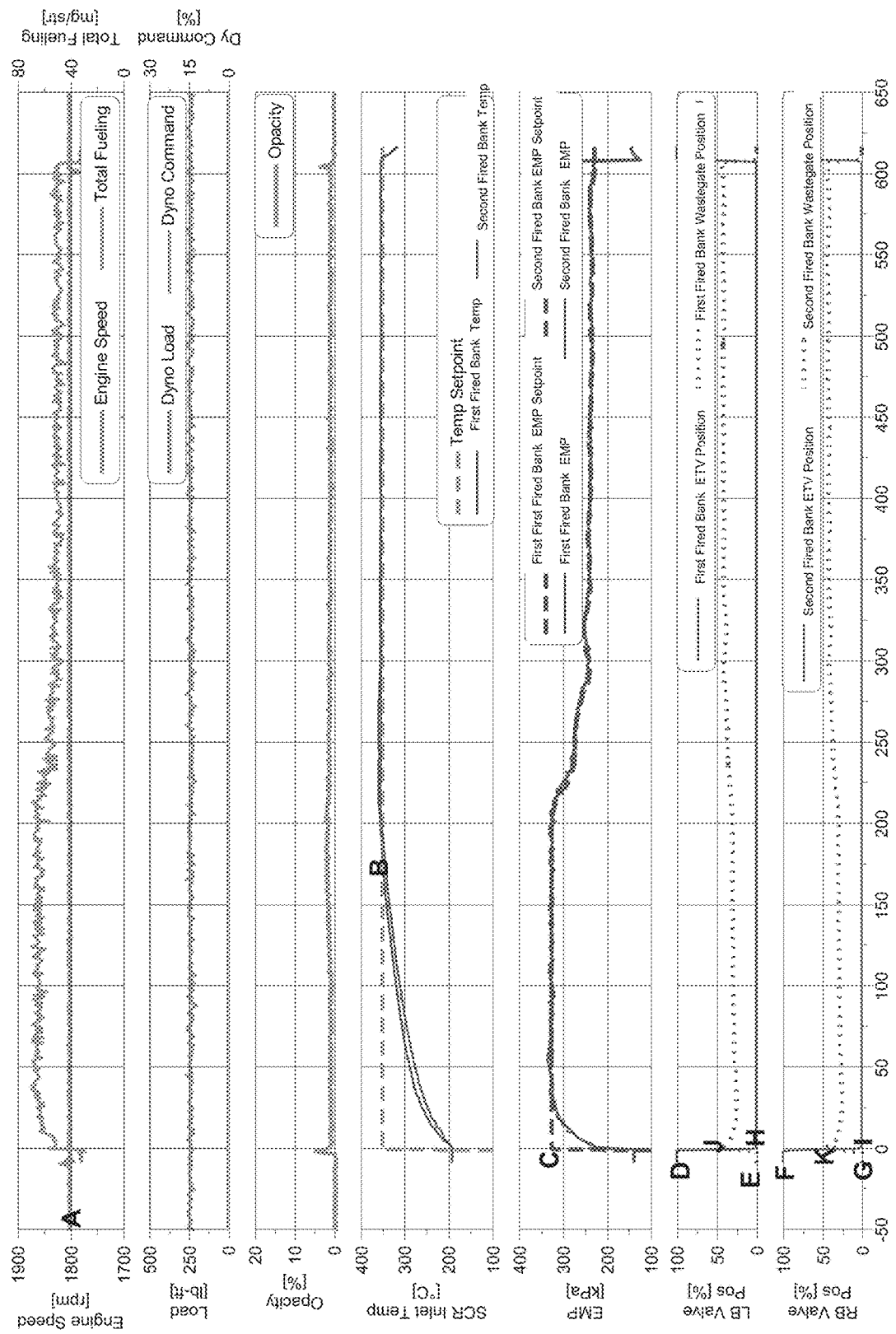
FIG. 4 is a graph of various parameters vs time based on utilization of a first bank and a second bank according to an example embodiment.

FIGS. 3-4 illustrate a graph of various exhaust system parameters vs time according to various embodiments. Illustrated in FIG. 3 is a graph of various exhaust system parameters based on the utilization of a bank (e.g., a single fired bank). When the controller receives a request to clean the exhaust system 10, the engine speed increases to 1200 rpm (revolutions per minute) at A. In this example, the inlet temperature setpoint is 350° C. (degrees Celsius) as shown at B. The inlet temperature of the SCR increases to 350° C. within approximately 240 seconds or 4 minutes. As shown at C, the exhaust manifold pressure setpoint for the active bank (e.g., the fired bank) is calibrated to 200 kPa, while the exhaust manifold pressure setpoint for the inactive bank (e.g., the non-fired bank) is calibrated to 400 kPa. Initially, the exhaust throttle valve position is 100% such that the exhaust throttle valve is fully open at D. The wastegate valve position of the active bank is initially 0% such that the wastegate valve is fully closed at E. Responsive to the controller determining that the exhaust manifold pressure of the active bank is below the exhaust manifold pressure setpoint (here, 200 kPa), the controller adjusts (e.g., closes) the exhaust throttle valve at E such that the valve position is at 0%. As illustrated at G, the controller adjusts the wastegate valve position to 50% responsive to the exhaust manifold pressure setpoint at 200 kPa. As the exhaust manifold pressure setpoint decreases below 200 kPa between 75 seconds and 400 seconds, less pressure is required such that the wastegate valve position is adjusted to 100%. In turn, the exhaust temperature of the active bank increases (as shown at B) to meet the temperature setpoint, thereby, cleaning the exhaust system 10.

FIG. 4 illustrates a graph of various parameters vs time based on utilization of a first bank and a second bank. Initially, the engine speed is 1800 rpm (revolutions per minute) at A. As illustrated, the inlet temperature setpoint is set to 350° C. (degrees Celsius) as shown at B. The inlet temperature of the SCR increases to 350° C. within approximately 180 to 240 seconds or 3 to 4 minutes. As shown at C, the exhaust manifold pressure setpoint for each active bank (e.g., each fired bank) is calibrated to 325 kPa. Initially, the exhaust throttle valve position of the first bank and the second bank is 100% such that the exhaust throttle valves of each respective bank is fully open at D and F. The wastegate valve position of the first bank and the second bank is initially 0% such that the wastegate valves are fully closed at E and G. When the controller determines that the exhaust manifold pressure of the first bank and the second bank are below the exhaust manifold pressure setpoint of 325 kPa, the controller adjusts (e.g., closes) the exhaust throttle valves at H and I such that the exhaust throttle valve positions are at 0%. As illustrated at J and K, the wastegate valve positions are adjusted from 0% to 50% responsive to the exhaust manifold pressure setpoint at 325 kPa. In turn, the exhaust temperature of the first bank and the second bank increases as shown at B to meet the temperature setpoint, thereby, cleaning the exhaust system 10. Although the valve positions associated with each respective bank in FIG. 4 as depicted are the same, the position of the exhaust throttle valve and the wastegate valve may be adjusted independently of the other such that the exhaust throttle valve and the wastegate valve may be adjusted to the same or different positions.

Figure 5:
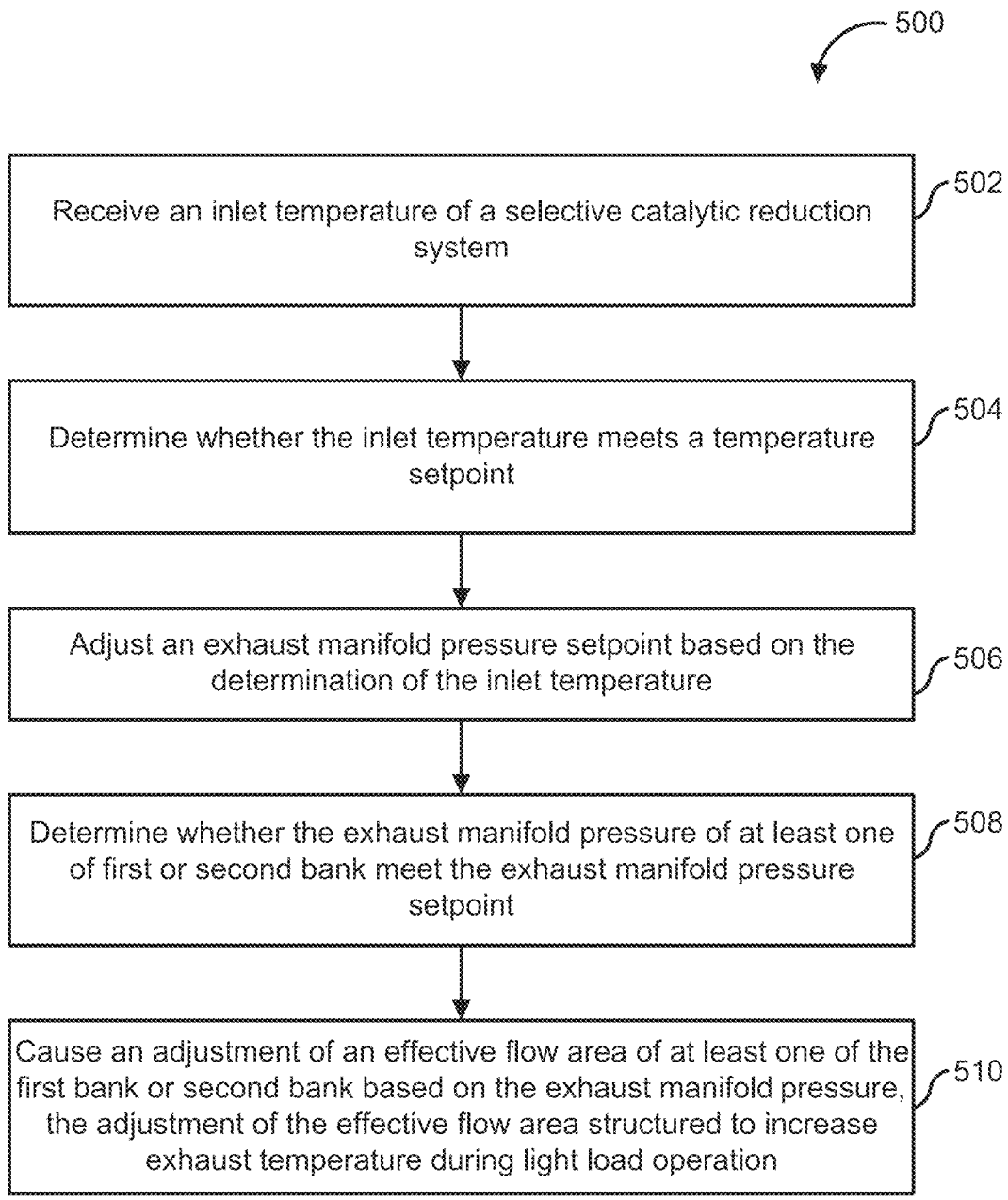
FIG. 5 is a schematic diagram of a flowchart of a method for increasing exhaust temperature of an exhaust system, according to an example embodiment.

Referring now to FIG. 5, a flowchart of a method for increasing exhaust temperature of an exhaust system is shown, according to one embodiment via the circuitry described herein with reference to FIGS. 1-4. At process 502, an inlet temperature of a selective catalytic reduction system is received. In one embodiment, the controller may include or be communicatively coupled to one or more sensors for receiving values indicative of the inlet temperature.

At process 504, the controller determines whether the inlet temperature meets a temperature setpoint. The inlet temperature setpoint may be associated with the SCR system of an active bank (e.g., a bank structured to include cylinders that are fired). The temperature setpoint may be a predetermined value or a value calculated according to a programmatic algorithm. The controller 20 may be structured to compare the inlet temperature to the temperature setpoint to determine whether the inlet temperature meets the temperature setpoint.

The exhaust manifold pressure setpoint is adjusted based on the determination of the inlet temperature at 506. If the inlet temperature (e.g., the SCR inlet temperature) is below the temperature setpoint, the controller increases the exhaust manifold pressure setpoint. The exhaust manifold pressure setpoint may be increased according to a calibrateable range. In example embodiments wherein a plurality of banks are active, such as the first bank and the second bank, the exhaust manifold pressure setpoint may be based on the inlet temperature expressing the lowest temperature (e.g., the inlet temperature of the coldest SCR) of the banks.

The controller determines whether the exhaust manifold pressure of at least one of first or second bank meet the exhaust manifold pressure setpoint at 508. In some embodiment, the controller may be structured to compare the exhaust manifold pressure of at least one of first or second bank to the exhaust manifold pressure setpoint to determine whether the whether the exhaust manifold pressure of the first and/or the second bank meet the exhaust manifold pressure setpoint. In other embodiments, the controller may determine whether the exhaust manifold pressure of the first and/or the second bank meet the exhaust manifold pressure setpoint or is otherwise within a predetermined range of the exhaust manifold pressure setpoint according to a programmatic algorithm. If the controller determines that the exhaust manifold pressure of at least one of the first bank or the second bank is below the exhaust manifold pressure setpoint, the controller adjusts (e.g., re-positions, opens, closes, etc.) the exhaust throttle valve and/or the wastegate valve to reduce the effective flow area.

An adjustment of an effective flow area of at least one of a first bank or second bank is caused based on the exhaust manifold pressure at 510. The adjustment of the effective flow area may be caused via the wastegate valve, the exhaust throttle valve, or a combination thereof. In some embodiments, the adjustment of the effective flow area may be caused in response to reducing the cylinders structured to operate the engine. The controller is structured to generate an effective flow area command structured to cause the adjustment of the effective flow area of at least one of the first bank or the second bank based on the exhaust manifold pressure. As the exhaust throttle valve and/or the wastegate valve is engaged or otherwise adjusted (e.g., closed, opened, etc.) responsive to the generation of the effective flow area command, the effective flow area is reduced. In turn, the exhaust temperature is increased according to the reduction of the effective flow area which, thereby, cleans the exhaust system 10.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit.

Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network. Where a circuit or portions of a circuit are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a computer or entirely on the computer or server. In the latter scenario, the computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As used herein, the term "proximate" may be used to refer to the position of a component or system in relation to one or more other components or systems such that the components may contact each other or may be near each other.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method, comprising:
    determining that a first plurality of cylinders of a first cylinder bank of an engine are active;
    determining that a second plurality of cylinders of a second cylinder bank of the engine are inactive;
    comparing an exhaust aftertreatment temperature to an exhaust aftertreatment temperature setpoint; and
    in response to the comparison, adjusting an effective flow area for exhaust gas from the first plurality of cylinders of the first cylinder bank of the engine to increase an exhaust gas temperature.

2. The method of claim 1, wherein the exhaust aftertreatment temperature is an inlet temperature of a selective catalytic reduction system.

3. The method of claim 1, further comprising comparing an exhaust manifold pressure for the first cylinder bank to an exhaust manifold pressure setpoint.

4. The method of claim 3, further comprising reducing the effective flow area in response to the comparison indicating that the exhaust manifold pressure is at or below the exhaust manifold pressure setpoint and that the exhaust aftertreatment temperature is below the exhaust aftertreatment temperature setpoint.

5. The method of claim 3, further comprising increasing the effective flow area for the exhaust gas in response to the comparison indicating that the exhaust manifold pressure is above the exhaust manifold pressure setpoint.

6. The method of claim 1, wherein adjusting the effective flow area comprises adjusting a position of at least one of a wastegate valve or an exhaust throttle valve.

7. A system of a vehicle, the system comprising:
    a controller including at least one processor and a memory storing instructions therein that, when executed by the at least one processor, cause the controller to:
        determine that a first plurality of cylinders of an engine are active;
        determine that a second plurality of cylinders of the engine are inactive;
        compare an exhaust aftertreatment temperature to an exhaust aftertreatment temperature setpoint; and
        in response to the comparison, adjust an effective flow area for exhaust gas from the first plurality of cylinders of the engine to increase an exhaust gas temperature.

8. The system of claim 7, wherein the exhaust aftertreatment temperature is a temperature regarding a selective catalytic reduction system.

9. The system of claim 7, wherein the exhaust aftertreatment temperature is approximately 300 degrees Celsius or above.

10. The system of claim 7, wherein, in response to the comparison, the instructions, when executed by the at least one processor, further cause the controller to adjust an exhaust manifold pressure setpoint based on the determined exhaust aftertreatment temperature.

11. The system of claim 10, wherein the instructions, when executed by the at least one processor, further cause the controller to compare an exhaust manifold pressure to the exhaust manifold pressure setpoint.

12. The system of claim 11, wherein the instructions, when executed by the at least one processor, further cause the controller to reduce the effective flow area in response to the comparison indicating that the exhaust manifold pressure is at or below the exhaust manifold pressure setpoint.

13. The system of claim 11, wherein the instructions, when executed by the at least one processor, further cause the controller to increase the effective flow area for the exhaust gas in response to the comparison indicating that the exhaust manifold pressure is above the exhaust manifold pressure setpoint.

14. The system of claim 7, wherein the adjustment includes adjusting a position of at least one of a wastegate valve or an exhaust throttle valve.

15. A system, comprising:
    a valve; and
    a controller coupled to the valve, the controller structured to:
        determine that a first plurality of cylinders of an engine are active;
        determine that a second plurality of cylinders of the engine are inactive;
        compare an exhaust aftertreatment temperature to an exhaust aftertreatment temperature setpoint; and
        in response to the comparison, adjust an effective flow area for exhaust gas from the first plurality of cylinders of the engine to increase an exhaust gas temperature.

16. The system of claim 15, wherein the exhaust aftertreatment temperature is a temperature regarding a selective catalytic reduction system.

17. The system of claim 15, wherein the controller is further structured to compare an exhaust manifold pressure to an exhaust manifold pressure setpoint, and wherein the controller is structured to reduce the effective flow area in response to the comparison indicating that the exhaust manifold pressure is at or below the exhaust manifold pressure setpoint.

18. The system of claim 15, wherein the controller is further structured to compare an exhaust manifold pressure to an exhaust manifold pressure setpoint, and wherein the controller is structured to increase the effective flow area for the exhaust gas in response to the comparison indicating that the exhaust manifold pressure is above the exhaust manifold pressure setpoint.

19. The system of claim 15, wherein the exhaust aftertreatment temperature is an inlet temperature of a selective catalytic reduction system that is approximately 300 degrees Celsius or above.

20. The system of claim 15, wherein the valve is at least one of an exhaust throttle valve or a wastegate valve.

* * * * *